(12) United States Patent
Kastinger

(10) Patent No.: US 6,882,066 B2
(45) Date of Patent: Apr. 19, 2005

(54) UNIPOLAR TRANSVERSE FLUX MACHINE

(75) Inventor: Guenter Kastinger, Gaggenau-Sulzbach (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 10/088,909

(22) PCT Filed: Jul. 17, 2001

(86) PCT No.: PCT/DE01/02668

§ 371 (c)(1), (2), (4) Date: Jul. 10, 2002

(87) PCT Pub. No.: WO02/09261

PCT Pub. Date: Jan. 31, 2002

(65) Prior Publication Data

US 2002/0171315 A1 Nov. 21, 2002

(30) Foreign Application Priority Data

Jul. 26, 2000 (DE) .......................................... 100 36 288

(51) Int. Cl.[7] .............................................. H20K 37/24
(52) U.S. Cl. ................. 310/49 R; 310/49 R; 310/49 A; 310/257; 310/156.64; 310/156.55; 310/216; 310/254
(58) Field of Search ............................. 310/49 R, 49 A, 310/257, 156.64, 256.55, 152.22, 254, 258, 2

(56) References Cited

U.S. PATENT DOCUMENTS 2,519,097 A 8/1950 Francis
4,306,164 A 12/1981 Itoh et al.
4,330,727 A 5/1982 Oudet

FOREIGN PATENT DOCUMENTS

| DE | 3927454 | * | 2/1991 | .......... H02K/19/00 |
| GB | 6673090 | * | 3/1950 | ............ H02K/2/16 |
| JP | 02237451 | * | 7/1989 | .......... H02K/21/14 |
| WO | WO 97 42699 A | | 11/1997 | |
| WO | WO 02/09261 A1 | * | 1/2002 | .......... H02K/21/18 |

* cited by examiner

Primary Examiner—Karl Tamai
Assistant Examiner—Iraj A. Mohandesi
(74) Attorney, Agent, or Firm—Ronald E. Greigg

(57) ABSTRACT

In a unipolar transverse flux machine, in particular a motor, having a rotor, which is comprised of two coaxial, ferromagnetic, toothed rotor rings, and a permanent magnet ring, which is magnetized in an axially unipolar fashion and is clamped axially between these rotor rings, and having a stator, which is concentric to the rotor shaft and has U-shaped stator yokes that represent the magnet poles, yoke elements, and a stator winding, in order to achieve an extremely flat design and to assure a definite start in a particular direction, the stator winding is embodied with two coils, whose one coil side extends respectively over a group of stator yokes and yoke elements arranged in succession in the circumference direction, along the side of the yoke elements remote from the rotor shaft, between the yoke legs, where the group spanned by the coil side of the one coil is disposed spatially offset on the stator circumference and electrically offset by 90° in relation to the group spanned by the coil side of the other coil.

16 Claims, 2 Drawing Sheets

UNIPOLAR TRANSVERSE FLUX MACHINE

CROSS-REFERENCE TO RELATED APPLICATIONS

This application is a 35 USC 371 application of PCT/DE 01/02668 filed on Jul. 17, 2001.

BACKGROUND OF THE INVENTION

1. Field of the Invention

The invention is directed to an improved unipolar transversal flux machine.

2. Description of the Prior Art

In a unipolar transverse flux machine of this kind (DE 100 21 914.4), it has already been proposed to embody the stator winding as an annular coil, which is disposed coaxial to the rotor axis and which, on the outside of the yoke elements remote from the rotor axis, passes through the yoke legs of the stator yoke. As a result, the machine can be one-stranded, i.e. can be embodied with one stator module and one rotor module, or can be multi-stranded, with at least two stator modules and rotor modules, where each of the stator modules disposed axially adjacent to each other has an annular coil of this kind. In the two-strand design, the stator modules or rotor modules are disposed electrically offset from each other by at least 90° and the annular coils are supplied with current pulses in a bipolar fashion as a function of the rotation angle of the rotor.

The single-strand machine with only one rotor module and stator module has the disadvantage that it cannot start by itself and additional auxiliary measures must be provided for starting it. However, it has the advantage of an extremely flat design.

SUMMARY OF THE INVENTION

The unipolar transverse flux machine according to the invention has the advantage of an extremely flat design and a definite start in a particular direction, which is assured by the two-strand design of the stator.

BRIEF DESCRIPTION OF THE DRAWINGS

An exemplary embodiment of the invention will be explained in detail in the description that follows, taken with the drawings, in which.

DESCRIPTION OF THE EXEMPLARY EMBODIMENT

Figure 1:
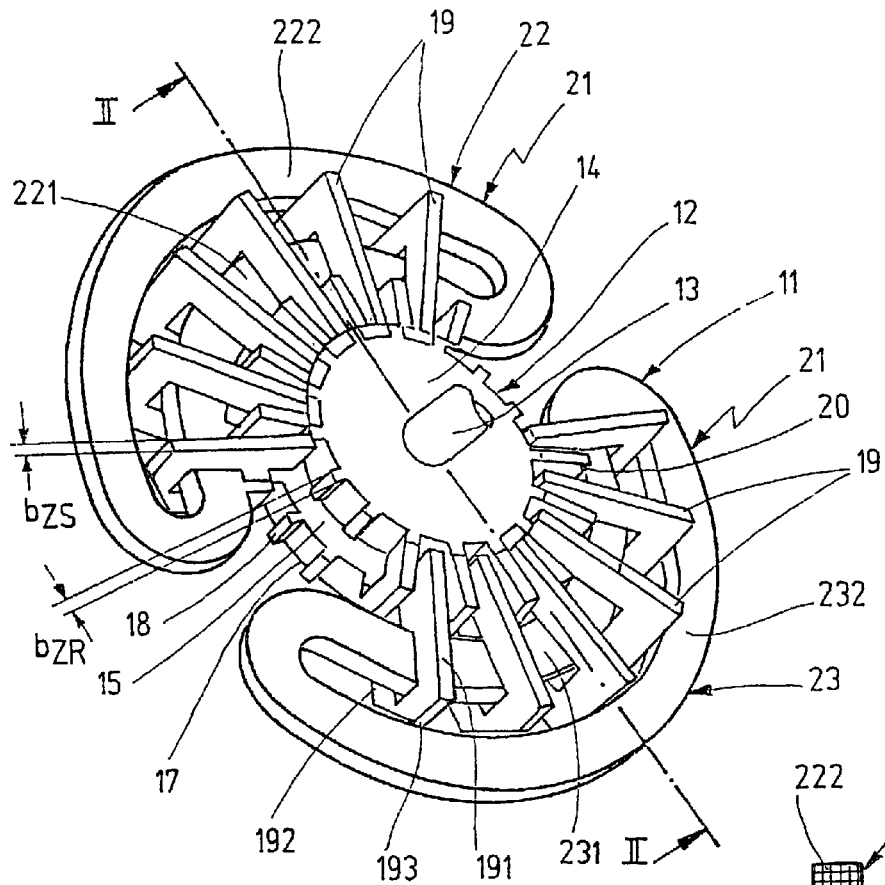
FIG. 1 is a perspective depiction of a unipolar transversal flux motor.

The unipolar transverse flux motor shown in various views and sections in the drawings as an exemplary embodiment of a universal unipolar transverse flux machine has a stator 11 and a rotor 12, which rotates inside the stator 11 and is non-rotatably supported on a rotor shaft 13.

Figure 2:
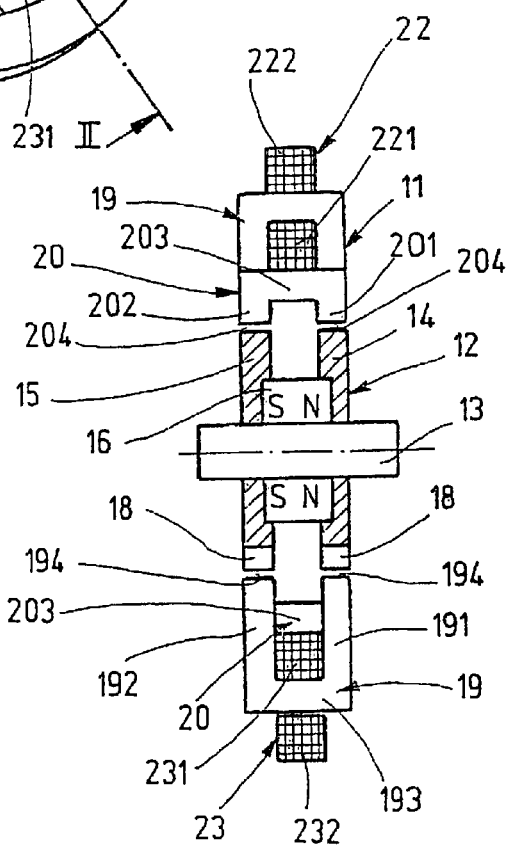
FIG. 2 shows a section along the line II—II in FIG. 1.

The rotor 12 is comprised of two coaxial ferromagnetic rotor rings 14, 15 (FIG. 2), which are non-rotatably supported on the rotor shaft 13 and between themselves, clamp a permanent magnet ring 16, which is magnetized in a unipolar fashion in the axial direction, i.e. in the direction of the rotor axis or housing axis. In FIG. 2, the direction of the magnetization of the permanent magnet ring 16 is labeled N-S by way of example. Each rotor ring 14, 15 is provided with a constant tooth spacing on its outer circumference oriented away from the rotor shaft 13 so that the teeth 18, which are separated from one another by respective tooth spaces 17, of the tooth rows produced have a uniform rotation angle spacing from one another. The teeth 18 on the rotor ring 14 and on the rotor ring 15 coincide with each other in the axial direction. The rotor rings 14, 15 with the teeth 18 formed onto them and of a piece with them are laminate and are preferably comprised of uniform sheet metal cutouts, which rest against one another in the axial direction.

The stator 11, which is disposed coaxial to the rotor 12, has U-shaped stator yokes 19 with two long yoke legs 191, 192, which are connected to each other by a crosspiece 193, yoke elements 20, which are disposed between the stator yokes 19 and which in the exemplary embodiment are U-shaped, with two short legs 201, 202 that are connected to each other by a crosspiece 203, and a stator winding 21. The stator yokes 19, which constitute the stator poles, and the yoke elements 20 are laminate and are composed of lamination bundles of stamped plates, where the width $b_{ZS}$ of the stator yokes 19 and the width of the yoke elements 20, each measured in the rotation direction, are approximately the same. In this connection, the ratio of the tooth with $b_{ZR}$ of the teeth 18 on the rotor rings 14, 15 to the tooth width $b_{ZS}$ of the stator yokes 19 and yoke elements 20 (each viewed in the rotation direction) is selected to be greater than 1 and less than 2, preferably less than or equal to 1.5. The stator yokes 19 are fixed to the housing 10 with a spacing which corresponds to the tooth spacing, and are disposed so that the one yoke leg 191 is disposed opposite the one rotor ring 14 and the other yoke leg 192 is disposed opposite the other rotor ring 15, each with a radial gap distance (FIG. 2). Between the stator yokes 19, there is a respective yoke element 20 disposed one half the yoke spacing apart from the stator yokes 19, where a certain offset is permissible in order, for example, to reduce moment ripples. The yoke elements 20 are in turn offset from each other by one yoke spacing. The yoke elements 20 extend over both rotor rings 14, 15 and are disposed with their short legs 201, 202 opposite the rotor rings 14, 15, each with a gap distance. The gap distance between the stator yokes 19 and the rotor rings 14, 15 on the one hand and the gap distance between the yoke elements 20 and the rotor rings 14, 15 on the other are the same size. The free end faces 194 of the yoke legs 191, 192 of the stator yokes 19 have at least the same axial width as the rotor rings 14, 15 or preferably protrude beyond the latter on one or both sides. The same is true of the yoke elements 20, in which the free end faces 204 also have at least the same axial width as the rotor rings 14, 15 or protrude beyond them on one or both sides.

The stator winding 21 is comprised of two identical coils 22, 23, in this case kidney-shaped ones (FIG. 1), each with two coil sides 221, 222 and 231, 232. The one coil side 221 or 231 of each coil 22 or 23 extends coaxial to the rotor axis or the rotor shaft 13 and extends over a group of stator yokes 19 and yoke elements 20 arranged in succession in the circumference direction, where the coil side 221 or 231, on the side of the yoke elements 20 remote from the rotor shaft 13, extends through between the yoke legs 191 and 192 of the stator yokes 19. Each group has an equal number of stator yokes 19 and yoke elements 20 arranged in succession in the circumference direction, which in the exemplary embodiment totals six stator yokes 19 and six yoke elements 20. in this connection, the upper group spanned by the coil side 221 of the coil 22 is disposed electrically offset by 90° at the circumference in relation to the lower group spanned by the coil side 231 of the coil 23, each group containing a total of twelve stator yokes 19 and yoke elements 20. In FIG. 1, this is shown by the fact that the yoke elements 20 of the lower group spanned by the coil side 231 are radially aligned with the teeth 18 of the rotor 12, while the yoke elements 20 in the upper group spanned by the coil side 221 are offset in the circumference direction from the teeth 18 of the rotor 12. With a tooth count of sixteen and therefore a tooth division of 22.50°, the offset of the two groups of stator yokes 19 and yoke elements 20 in relation to each other is 5.626° of circumference angle. The other coil side 222 or 232 of the coil 22 or 23, on the outside of the stator yokes 19 remote from the rotor shaft 13, extends over their crosspieces 193, likewise coaxial to the rotor shaft 13, and is shaped like a segment of a circle, the same as the coil sides 221 and 231.

In order to produce the electrical offset of 90° between the two groups of stator yokes 19 and yoke elements 20 and to accommodate winding heads of the coils 22, 23, the number of stator yokes 19 belonging to a group is less than the greatest possible number of stator yokes 19 based on the tooth spacing or yoke spacing. In the exemplary embodiment of FIG. 1, the rotor 12 has sixteen teeth 18. The maximal possible number of stator yokes 19 is therefore likewise sixteen, as is the maximal number of yoke elements 20. In the exemplary embodiment in FIG. 1, each coil 22, 23, however, is only associated with six stator yokes 19 and six yoke elements 20, which together yield a total of twelve poles for each coil 22, 23, where the coils 22, 23 are disposed with the respective poles diametrically opposite from one another in order to accommodate the winding heads of the coils 22, 23 in the pole-free spaces.

Figure 3:
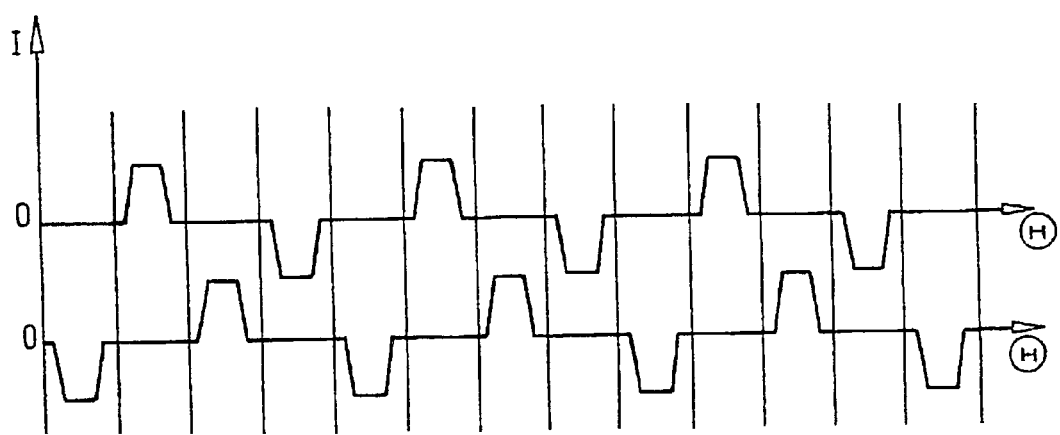
FIG. 3 shows a graph of the power supply to the stator of the motor.

The two coils 22, 23, which each represent a winding phase or a winding strand of a two-phase, permanent magnet-excited motor, are supplied with current pulses in a bipolar fashion as a function of the rotation angle of the rotor 12, where the current pulses in the coils 22, 23 are phase-shifted from each other by 90°, for example. The power supply pattern for the two coils 22, 23 is shown in FIG. 3 as a function of the rotation angle θ of the rotor 12. The rotation angle distance between each of the vertical lines shown is 5.625°.

The foregoing relates to preferred exemplary embodiments of the invention, it being understood that other variants and embodiments thereof are possible within the spirit and scope of the invention, the latter being defined by the appended claims.

What is claimed is:

1. A unipolar transversal flux machine, in particular a unipolar transversal flux motor, comprising a rotor (12), which is non-rotatably supported on a rotor shaft (13) and is comprised of two coaxial ferromagnetic rotor rings (14, 15), which on their outer circumference remote from the rotor shaft (13), are provided with constant tooth spacing, and having a permanent magnet ring (16), which is magnetized in an axially unipolar fashion and is clamped axially between the rotor rings (14, 15), and a stator (11), which is concentric to the rotor shaft (13) and has U-shaped stator yokes (19) with two yoke legs (191, 192) that are connected to each other by a crosspiece (193), which stator yokes (19) are fixed to a housing (10) with a spacing that corresponds to the tooth spacing, and are disposed so that the one yoke leg (191) is disposed opposite the one rotor ring (14) and the other yoke leg (192) is disposed opposite the other rotor ring (15), each with a radial gap distance, yoke elements (20), each of which is disposed between respective stator yokes (19) arranged one after the other in the rotation direction of the rotor (12), extends axially over the two rotor rings (14, 15), and is disposed opposite them with a radial gap distance, and a stator winding (21), the stator winding (21) having two coils (22, 23), each with two coil sides (221, 222 or 231, 232), whose one coil side (221 or 231) extends coaxial to the rotor shaft (13), respectively over a group of stator yokes (19) and yoke elements (20) arranged in succession in the circumference direction, along the side of the yoke elements (20) remote from the rotor shaft (13), between the yoke legs (191, 192), and wherein the group spanned by the coil side (221) of the one coil (22) is disposed spatially offset on the stator circumference and electrically offset by 90° in relation to the group spanned by the coil side (231) of the other coil (23).

2. The machine according to claim 1, wherein the other coil side (222 or 232) of the two coils (22, 23) extends on the outside of the crosspieces (193) of the stator yokes (19), remote from the rotor shaft (13).

3. The machine according to claim 1, wherein each group has an equal number of stator yokes (19) and yoke elements (20) arranged in succession in the circumference direction.

4. The machine according to claim 2, wherein each group has an equal number of stator yokes (19) and yoke elements (20) arranged in succession in the circumference direction.

5. The machine according to 1, wherein the total number of stator yokes (19) spanned by the one coil sides (221, 231) of the two coils (22, 23) is less than the greatest possible number of stator yokes (19) based on the tooth spacing or yoke spacing.

6. The machine according to 2, wherein the total number of stator yokes (19) spanned by the one coil sides (221, 231) of the two coils (22, 23) is less than the greatest possible number of stator yokes (19) based on the tooth spacing or yoke spacing.

7. The machine according to 1, wherein the two coils (22, 23) are supplied with current pulses in a bipolar fashion as a function of the rotation angle (θ) of the rotor (12), and that the current pulses in the coils (22, 23) are phase-shifted in relation to each other, in particular by 90°.

8. The machine according to 2, wherein the two coils (22, 23) are supplied with current pulses in a bipolar fashion as a function of the rotation angle (θ) of the rotor (12), and that the current pulses in the coils (22, 23) are phase-shifted in relation to each other, in particular by 90°.

9. The machine according to claim 1, wherein the stator yokes (19), the yoke elements (20), and the rotor rings (14, 15) are laminate.

10. The machine according to claim 1, wherein the yoke elements (20) are disposed offset from the stator yokes (19), in particular by one half the yoke spacing.

11. The machine according to claim 1, wherein the radial gap distance between the stator yokes (19) and the rotor rings (14, 15) on the one hand and the radial gap distance between the yoke elements (20) and the rotor rings (14, 15) on the other are the same size.

12. The machine according to claim 1, wherein the the free end faces (194) of the yoke legs (191, 192) of the stator yokes (19) have at least the same axial width as the rotor rings (14, 15) and preferably protrude beyond the latter on one or both sides.

13. The machine according to claim 1, wherein that width of the stator yokes (19) and the width of the yoke elements (20), each measured in the rotation direction, are approximately the same.

14. The machine according to claim 1, wherein the ratio of the tooth width ($b_{ZR}$) of the teeth (18) on the rotor rings (14, 15) to the width ($b_{ZS}$) of the stator yokes (19) and yoke elements (20), each viewed in the rotation direction, is selected to be greater than 1 and less than 2, preferably less than or equal to 1.5.

15. The machine according to claim 1, wherein that the yoke elements (20) are U-shaped, each with two short legs (201, 202), which are disposed radially opposite a rotor ring (14, 15), and a crosspiece (203), which connects these legs to each other.

16. The machine according to claim 15, wherein the free end faces (204) of the short legs (201, 202) of the yoke elements (20) have at least the same axial width as the rotor rings (14, 15) and preferably protrude beyond them on one or both sides.

* * * * *